(12) United States Patent
Bland (10) Patent No.: US 8,795,567 B2
(45) Date of Patent: Aug. 5, 2014

(54) METHOD FOR FABRICATING HIGHLY CONTOURED COMPOSITE STIFFENERS WITH REDUCED WRINKLING

(75) Inventor: Jamel R. Bland, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 377 days.

(21) Appl. No.: 12/888,758

(22) Filed: Sep. 23, 2010

(65) Prior Publication Data

US 2012/0076989 A1    Mar. 29, 2012

(51) Int. Cl.
*B29C 70/34* (2006.01)
*B32B 5/02* (2006.01)

(52) U.S. Cl.
USPC .......................................... 264/258; 428/174

(58) Field of Classification Search
None
See application file for complete search history.

(56) References Cited

U.S. PATENT DOCUMENTS

| | | | |
|---|---|---|---|
| 7,469,735 B2 | 12/2008 | Brown et al. | |
| 2006/0249868 A1 | 11/2006 | Brown et al. | |
| 2007/0277919 A1 | 12/2007 | Savol et al. | |
| 2008/0111024 A1* | 5/2008 | Lee et al. | 244/121 |
| 2009/0155511 A1 | 6/2009 | Marissen | |
| 2009/0261199 A1 | 10/2009 | McCarville et al. | |
| 2009/0263618 A1 | 10/2009 | McCarville et al. | |
| 2010/0078845 A1 | 4/2010 | Guzman et al. | |

* cited by examiner

*Primary Examiner* — Benjamin Schiffman
(74) *Attorney, Agent, or Firm* — Yee & Associates, P.C.

(57) ABSTRACT

A mandrel having an out-of-plane curvature and a corresponding in-plane change in mandrel geometry is used to fabricate substantially wrinkle-free, fiber reinforced stiffeners having an out-of-plane curvature.

12 Claims, 7 Drawing Sheets

METHOD FOR FABRICATING HIGHLY CONTOURED COMPOSITE STIFFENERS WITH REDUCED WRINKLING

TECHNICAL FIELD

This disclosure generally relates to processes for fabricating composite structures, and deals more particularly with a method and apparatus for fabricating highly contoured, fiber reinforced composite stiffeners with reduced wrinkling.

BACKGROUND

During the process of laying up plies of unidirectional fiber reinforced pre-preg to form a composite laminate, such as a stiffener, wrinkles may sometimes form in one or more of the plies. Wrinkles are undesirable because they may result in voids or discontinuities in the cured laminate. Wrinkling may be due to, without limitation, a ply being deformed during the lay-up process and/or to relatively high friction between the unidirectional reinforcing fibers caused by the tackiness of the uncured resin. Wrinkling may be particularly problematic where a stack of unidirectional pre-preg plies is formed over a highly contoured tool surface.

In the past, in order to avoid wrinkling in contoured areas, pre-preg plies were cut into sections. The sections were then spliced together and individually placed on a contoured forming tool in order to achieve a desired curvature. However cutting and splicing the plies in this manner may have an undesirable effect on the properties of the cured part. In order to compensate for these potentially reduced properties, additional plies or doublers were sometimes required which may result in an increase in the thickness and weight of the stiffener. The cutting and splicing technique described above is also time consuming and labor intensive, results in material waste and may induce undesirable preload in the cured part. Also, when there is a need to add plies to the IML (inner mold line) it is necessary to add these plies gradually, at a specific rate, so that the contour of the IML is not too severe.

Accordingly, there is a need for a method and apparatus for fabricating highly contoured, fiber reinforced composite parts, such as stiffeners which may substantially reduce or eliminate ply wrinkling during the lay-up process, and which avoids the need for cutting and splicing plies.

SUMMARY

According to the disclosed embodiments, a method and apparatus are provided for fabricating highly contoured, fiber reinforced composite stiffeners, such as stringers, in which the reinforcing fibers are continuous throughout areas of curvature in the stiffener, and ply wrinkling is substantially reduced or eliminated. Ply wrinkling is avoided by tailoring the geometry of a lay-up mandrel to accommodate the stiffener's material characteristics. The material characteristics are accommodated by selectively widening or narrowing parts of the mandrel, depending upon the geometry of the stiffener part. These geometrical changes in the mandrel adjust the mandrel contour without requiring a change in the thickness of the stiffener part. Also, the disclosed method may allow increasing the allowable contour in areas where plies may need to be added, so that the rate at which the plies can be increased which may reduce the parasitic weight caused by past constraints on contour.

The tailored shape of the mandrel allows the fibers, especially the zero degree fibers, to traverse high contoured areas continuously and substantially without wrinkling. Structural properties of the cured stiffener may not be degraded since the higher stiffness plies, i.e. the zero degree plies of the composite, are not required to be cut and spliced, but rather extend continuously throughout the length of the stiffener's curvatures. Higher production rates may be realized using the disclosed fabrication method since the plies may not need to be altered (cut and spliced) as they are being laid up. Also, larger variations in stiffener contour may be accommodated, which in turn may permit more complex and weight efficient stiffener designs to be realized.

According to one disclosed embodiment, a method is provided of fabricating a substantially wrinkle-free fiber reinforced composite stiffener having an out-of-plane curvature. The method comprises providing a tool having the desired out-of-plane curvature and a corresponding in-plane curvature, forming a lay-up over the tool and compacting the layup. Forming the layup includes laying up a plurality of fiber reinforced plies over the tool and conforming the plies to the out-of-plane curvature and to the corresponding in-plane curvature of the tool. Conforming the plies to the out-of-plane curvature includes allowing the fibers in each of the plies to deform generally from a nominal linear orientation to a deformed orientation determined by the out-of-plane curvature. Compacting the lay-up includes compacting each of the plies to substantially eliminate any wrinkles in the ply and to set the deformed fiber orientation into the ply.

According to another disclosed embodiment, a method is provided of fabricating a substantially wrinkle-free, fiber reinforced composite stringer having a hat-shaped cross section and an out-of-plane curvature along its length. The method comprises assembling a layup by laying up fiber reinforced composite plies on a forming tool and using the forming tool to form the out-of-plane curvature in the layup. The method further comprises using the tool to form a corresponding in-plane curvature in the layup. In one embodiment, the hat-shaped stringer includes a cap, sides and bottom flanges, and the out-of-plane curvature is formed in the flanges of the stringer. The corresponding in-plane curvature is formed in the sides of the stringer.

According to another embodiment, a method is provided of making a mandrel for laying up a substantially wrinkle-free fiber reinforced composite stiffener having an out-of-plane curvature. The method comprises forming at least one out-of-plane curvature in a mandrel body, and forming an in-plane curvature in the mandrel body substantially corresponding to the out-of-plane for compensating for the effects of the out-of-plane curvature on composite plies laid up over the mandrel body. The at least one out-of-plane curvature is formed in a first tool face on the mandrel body, and the in-plane curvature is formed in a second tool face adjacent the first tool face.

According to a further embodiment, apparatus is provided for forming a substantially wrinkle-free fiber reinforced composite stiffener having an out-of-plane curved section along its length. The apparatus comprises a mandrel on which fiber reinforced composite plies may be formed. The mandrel has a first tool face including a section substantially matching the out-of-plane curved section of the stiffener, and a second tool face that includes a section having an in-plane curved section substantially corresponding to the out-of-plane curve section in the first tool face. The first and second tool faces extend traverse and are contiguous to each other.

According to still another embodiment, apparatus is provided for fabricating a fiber reinforced, substantially wrinkle-free composite stringer having an out-of-plane curvature. The apparatus comprises a stringer mandrel having an out-of-plane curvature and a corresponding in-plane change in mandrel geometry.

BRIEF DESCRIPTION OF THE ILLUSTRATIONS

DETAILED DESCRIPTION

Figure 1:
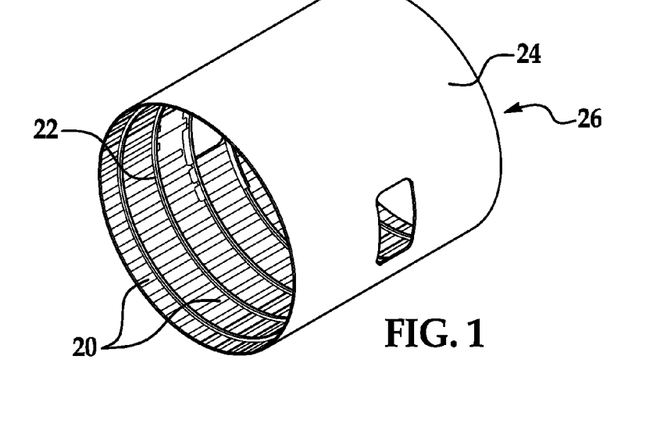
FIG. 1 is an illustration of a perspective view of a section of an airplane fuselage.

Referring to FIGS. 1-4, the disclosed embodiments relate to a method and apparatus for fabricating unidirectional fiber reinforced composite laminate stiffeners 20 having an out-of-plane curvature 36 along one or more sections 40 along their length, including stiffeners 20 having compound contours. The stiffeners 20 may be used in a variety of applications. For example, FIG. 1 illustrates an airplane fuselage 26 having an outer skin 24 attached to spaced apart, barrel frames 22 and longitudinally extending, circumferentially spaced stiffeners 20 sometimes referred to as stringers 20. The stringers 20 are attached to and function to stiffen the skin 24. As will be discussed below, the skin 24 may have one or more undulations or curvatures 34 (FIGS. 2 and 3) to which the stringers 20 may be required to conform.

Figure 2:
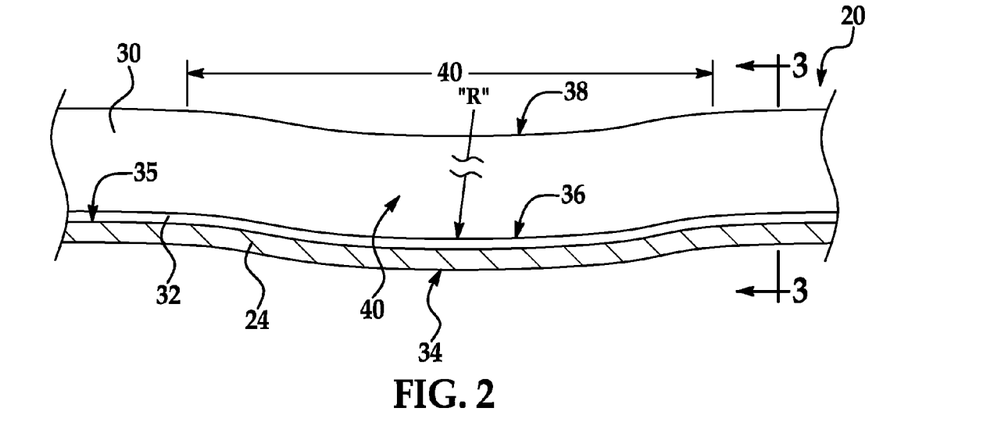
FIG. 2 is an illustration of a longitudinal sectional view of a stringer used in the fuselage of FIG. 1, and having an out-of-plane curvature conforming to a curvature in the fuselage skin.
Figure 3:
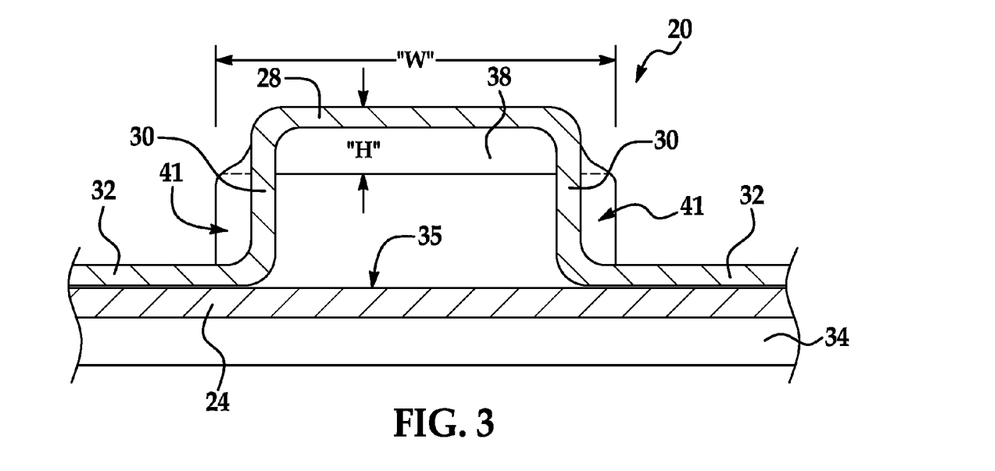
FIG. 3 is an illustration of a sectional view taken along the line 3-3 in FIG. 2.
Figure 4:
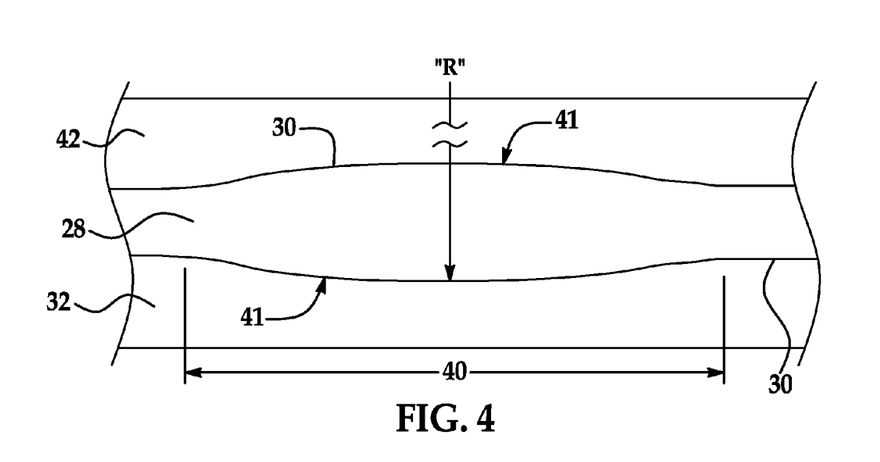
FIG. 4 is an illustration of a plan view of the stringer shown in FIGS. 2 and 3.

Referring particularly to FIGS. 2, 3 and 4, in the illustrated example, the stringer 20 used to stiffen the skin 24 is hat-shaped in cross section, although other cross sectional shapes are possible, as will be discussed in more detail below. The stringer 20 comprises a generally flat cap 28 connected by sidewalls 30 to laterally extending flanges 32 that substantially conform and are secured to the inside surface 35 of the skin 24 by any suitable means. In the illustrated embodiment, the sidewalls 30 extend substantially normal to the cap 28 and flanges 32, however, in other examples the sidewalls 30 may be inclined relative to the cap 28 and/or flanges 32. The flanges 32 include an out-of-plane curvature 36 extending along section 40 of the stringer 20, which substantially matches the curvature 34 in the skin 24, so that the flanges 32 substantially conform to the skin 24 in the section 40 of curvature. As used herein, "out-of-plane curvature" refers curvatures which are not substantially within the plane of the plies in the flanges 32, or within planes that extend parallel to the plane of plies in the flanges 32.

During the ply layup and forming process, the out-of-plane curvature 36 in the flanges 32 causes the plies in the flanges 32 to place tension on plies in the sidewalls 30 along section 40. This tension ordinarily would tend to cause the plies in the sidewalls 30 to draw away from the forming tool (not shown) resulting in ply wrinkles during the forming process and prior to curing, particularly where the stringer is fabricated by forming an flat stack of plies over a contoured tool (not shown), in part because friction between the pre-preg plies make it more difficult for the plies to move relative to each other and to conform to the contours of the tool.

In order to accommodate such material characteristics of the plies and reduce or eliminate ply wrinkling (not shown in FIGS. 2 and 3), the plies are laid up and formed in a manner that results in the stringer 20 having in-plane changes in geometry corresponding to the out-of-plane curvature 36. In the illustrated embodiment these in-plane changes in geometry comprise an outward curvature 41 of the sidewalls 30 within section 40, immediately adjacent the out-of-plane curvature 36. The outward curvature 41 of the sidewalls 30 has a radius of curvature "R" (FIG. 4) substantially matching the radius of curvature "R" (FIG. 2) of the out-of-plane curvature 36, so that sidewall curvature 41 is essentially a mirror image of the flange curvature 36. As a result, the sidewalls 30 extend smoothly through section 40 of the stringer 20, without substantial wrinkling.

As a result of the in-plane sidewall curvature 41, the cap 28 is provided with a downward curvature 38 of radius "R" resulting in a reduction in the height "H" of the cap 28 and a contoured widening "W" along the section 40. This contouring of the cap 28 reflects the in-plane changes in the sidewalls 30.

Figure 5:
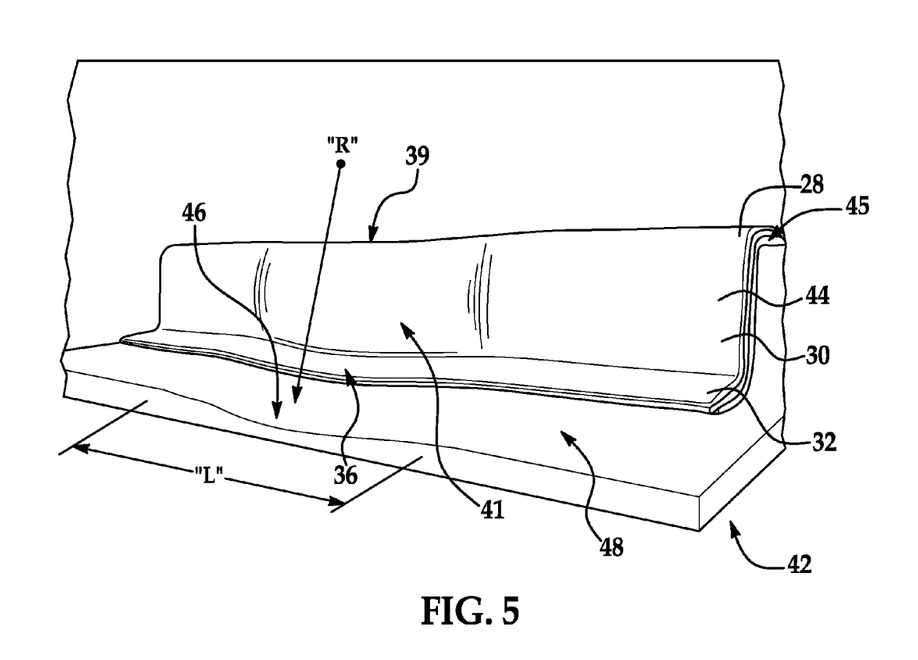
FIG. 5 is an illustration of a perspective view of a mandrel having a stringer layup formed thereon.
Figure 6:
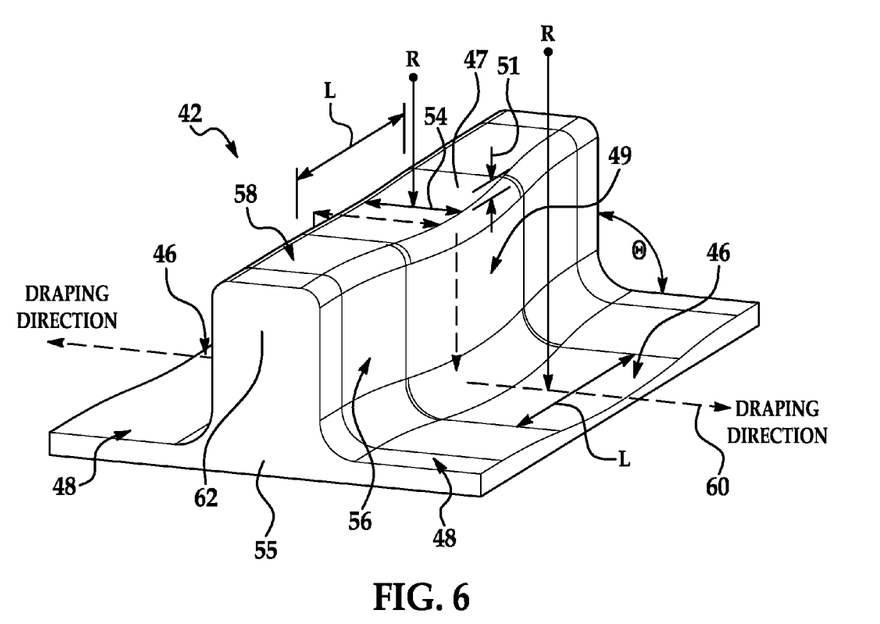
FIG. 6 is an illustration of an isometric view of the mandrel shown in FIG. 5.

FIG. 5 illustrates a tool mandrel 42 on which a multi-ply, pre-preg laminate lay-up 44 may be formed as part of the process of fabricating the stringer 20 shown in FIGS. 2-4. Unidirectional fiber reinforced plies 45 are laid up by draping them over the mandrel 42 to form the layup 46. In one embodiment, an ordered flat stack (not shown) of pre-preg plies is laid up according to a predefined ply schedule (not shown) which may specify the number, order and fiber orientation of the plies in the stack. The flat ply stack is then draped over the tool mandrel 42 in the direction shown by the arrow 60 in FIG. 6, and conformed to the contours of the mandrel 42.

The tool mandrel 42 includes a bottom tool face 48 having an out-of-plane curvature 46 which corresponds in length "L" and radius "R" to the out-of-plane curvature 36 in the flanges 32 of the cured stringer 20. FIG. 5 also illustrates the corresponding in-plane changes in geometry of the stringer lay-up 44, comprising the in-plane, outward curvature 41 of the sidewalls 30. In effect, the inner mold line (IML) contour of the mandrel 42 is rotated +/−90 degrees so that its contour is reflected in the cap 28 and sidewalls 30 of the stringer 20 (FIG. 2a Referring now to FIG. 6, the mandrel 40 comprises a mandrel body 55 having a top tool face 58, side tool faces 56 and bottom tool faces 48 which respectively form the IML of the cap 28, sidewalls 30 and flanges 32 of the stringer 20 (FIG. 3). Each of the bottom tool faces 48 has a curvature 46 of radius "R" and length "L", as previously described in connection with FIG. 5. The mandrel 42 also has an in-plane change in geometry, corresponding to the out-of-plane curvature 46 along the length "L" of the out-of-plane curvature 46. This in-plane change in geometry comprises an outward curvature 49 in the side tool faces 56 which substantially matches the radius "R" and length "L" of the out-of-plane curvature in the bottom tool faces 48. The top tool face 58 includes a downwardly curved section which substantially matches the radius "R" and length "L" of the out-of-plane curvature in the bottom tool faces 48. The curvature 49 in the side tool faces 56 results in an increase in the width 54 of the top tool face along the length "L", as well as a reduced height shown by the numeral 51.

The in-plane change in geometry of the mandrel 42 that is needed to compensate for the affects on the ply material caused by the out-of-plane curvature 46 is determined by the location, geometry and dimensions of the out-of-lane curvature 46. In the illustrated embodiment, the out-of-plane curvature 46 has a radius "R" and extends along a length "L" of the mandrel 42, consequently, an in-plane plane change in mandrel geometry is required that also has a radius "R" and length "L", formed in a manner that compensates for the "pull" on the ply material overlying the mandrel side tool face 56. This pull on the ply material is caused by the ply material being drawn down into the curvature 46 in the adjacent bottom tool face 48 during the forming process. The side tool faces 56 are curved in the direction that the material is being pulled as a result of being drawn down into the out-of-plane curvature 46, i.e., the tool faces 56 are curved outwardly in the illustrated example to generally match the outward displacement of the ply material caused by ply material "pull" generated on the bottom tool faces 48 by the out-of-plane curvature 46. The amount of change in the in-plane geometry required to compensate for the affects on ply material caused by an out-of-plane curvature may also depend in part on the angle θ between two adjacent sides of a forming tool, such as the adjacent tool faces 48 and 56 on mandrel 42.

Figure 7:
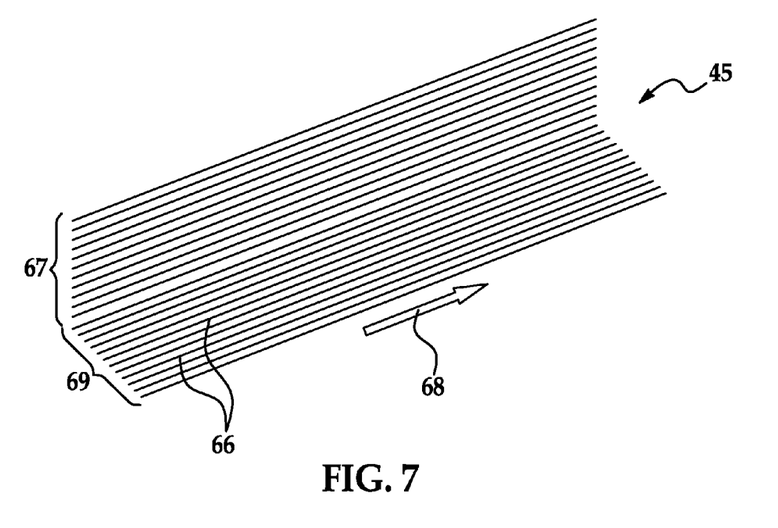
FIG. 7 is an illustration of a perspective view of a portion of a single ply, showing the position of the fibers having been laid up on, but not yet conformed to the geometry of the mandrel shown in FIG. 6.
Figure 8:
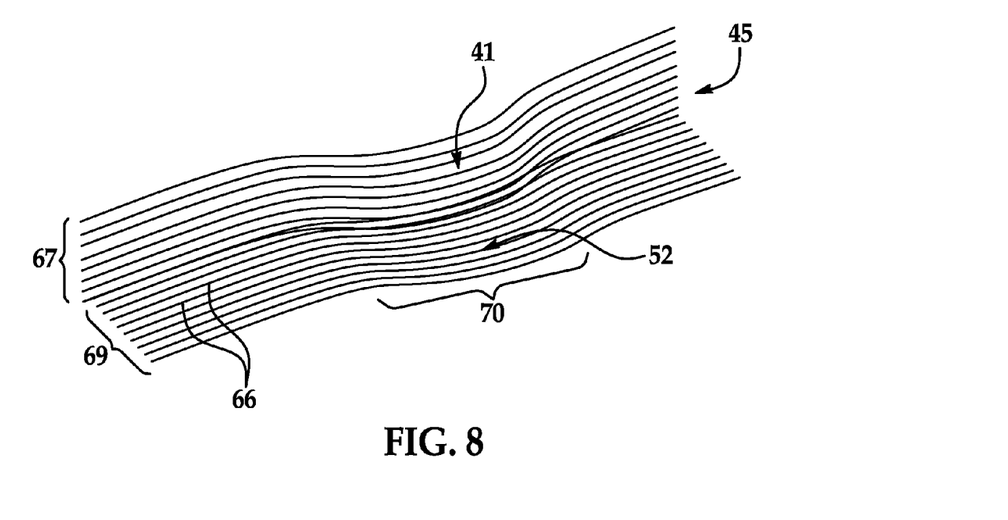
FIG. 8 is an illustration similar to FIG. 7, but showing the ply fibers having been conformed to the geometry of the mandrel following compaction.

Referring now to both FIGS. 7 and 8, FIG. 7 illustrates two portions 67, 69 of a ply 45 with unidirectional fibers 66 having a zero degree fiber orientation after being draped over the mandrel 42 shown in FIG. 5, but before being compacted to conform to the features of the mandrel 42. The zero degree fibers 66 extend substantially parallel to each other prior to being pressed against the mandrel 42. At this point, one portion 67 of the ply 45 overlies one of the side tool faces 56, and the other portion 69 overlies one of the bottom tool faces 48. Referring to FIG. 8, during compaction, the fibers 66 are deformed so as to conform to the out-of-plane curvature 46 (FIG. 6) on the bottom tool face 48, resulting in a section 70 of the fibers 66 assuming the downward curvature shown at 52 which substantially matches the out-of-plane curvature 46 of the mandrel 42 shown in FIG. 6. Similarly, the fibers 66 in the ply portion 67 are deformed during compaction to assume an outward curvature 41 substantially matching the curvature of the side tool face of the mandrel 42 shown in FIG. 6. During the compaction process, the fibers 66 deform generally from a nominal linear orientation shown in FIG. 6 to the deformed orientations 52, 41 shown in FIG. 8 which are respectively determined by the out-of-plane curvature 46 on the bottom tool face 48 of the mandrel 42 of FIG. 6 and the corresponding change in geometry 49 in the side tool face 56 of the mandrel 42.

Figure 9:
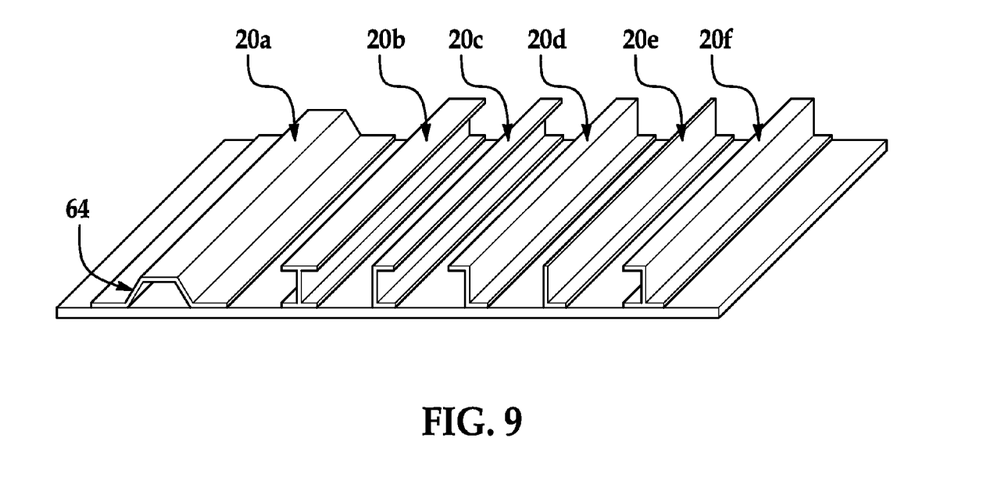
FIG. 9 is an illustration of a perspective view showing examples of stiffener shapes that may be formed using the disclosed method and apparatus.

The hat-shaped stringer 20 described above is merely illustrative of a wide range of stiffener configurations that may be formed using the disclosed method and apparatus. For example, as shown in FIG. 9, the disclosed method and apparatus may be employed to produce at least portions of substantially wrinkle free stiffeners that may be used as stringers or for other purposes, which have cross sections corresponding to a modified hat 20a having inclined sidewalls 64, an "I" 20b, a "C" 20c, a "Z" 20d, an "L" 20d and a "J" 20e.

Figure 10:
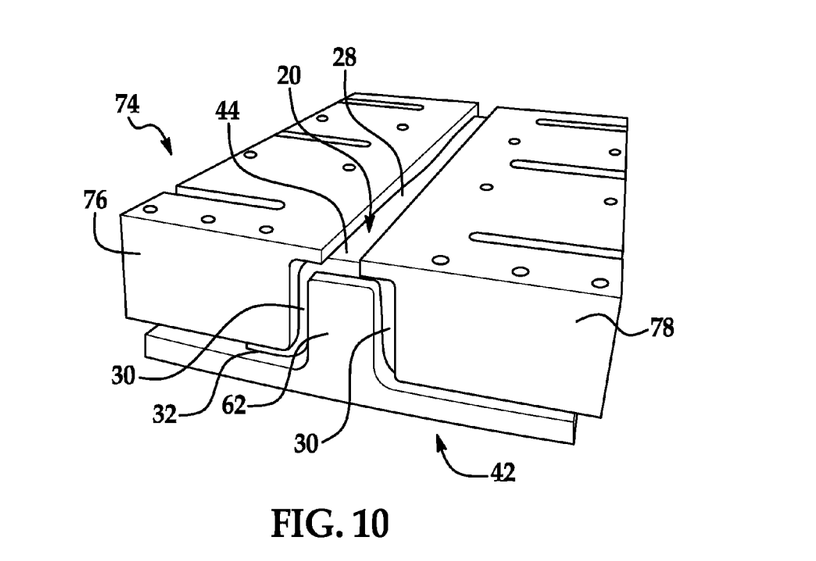
FIG. 10 is an illustration of a perspective view of a set of tooling compacting the layup shown in FIG. 5.
Figure 11:
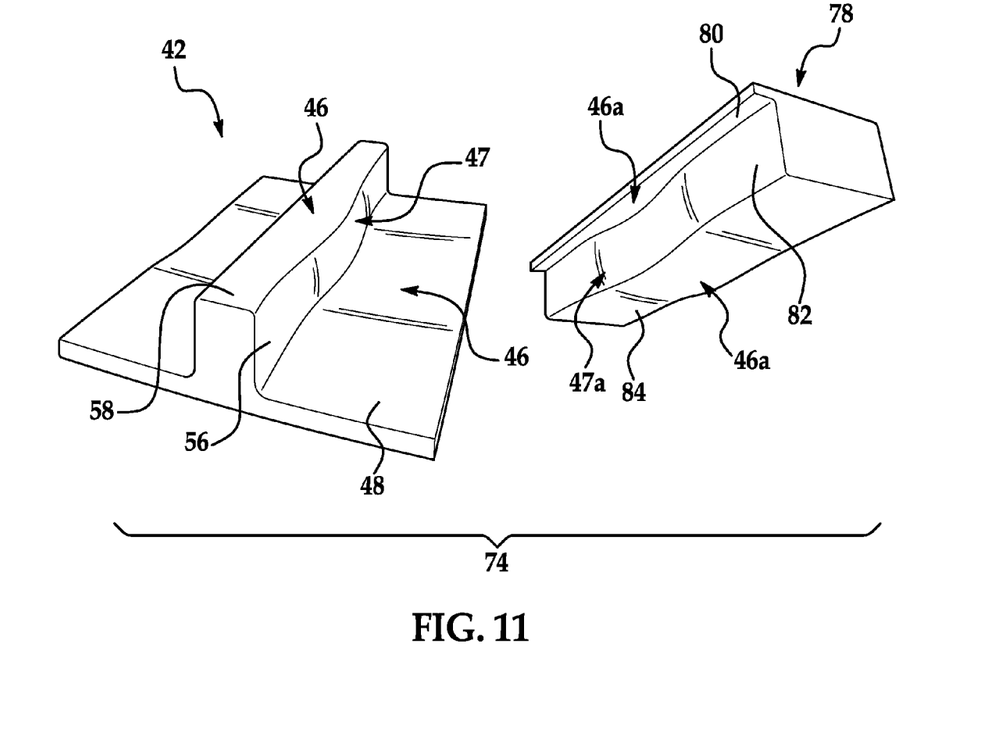
FIG. 11 is an illustration of a perspective view of the mandrel and one of the compaction tools shown in FIG. 10.

FIGS. 10 and 11 show additional details of tooling 74 used to form and compact the stringer layup 44. A pair of compaction tools 76, 78 is used to compact the layup 44 against the mandrel 42. Compaction may be achieved, for example and without limitation, by using conventional vacuum bag and/or autoclave processing. As best seen in FIG. 11, each of the compaction tools 78 includes a flange 80, sidewall 82 and bottom 84 which respectively compact and apply pressure to the cap 28, sidewalls 30 and flanges (FIG. 3) of the stringer layup 44. The flange 80 and bottom 84 each include an out-of-plane curvature 46a that respectively correspond to the curvatures 46 in the top tool face 58 and bottom tool face 48 of the mandrel 42. Similarly, the side 82 of the compaction tool 78 includes a curved section 47a that substantially matches that of the side tool faces 56 of the mandrel 42.

Figure 12:
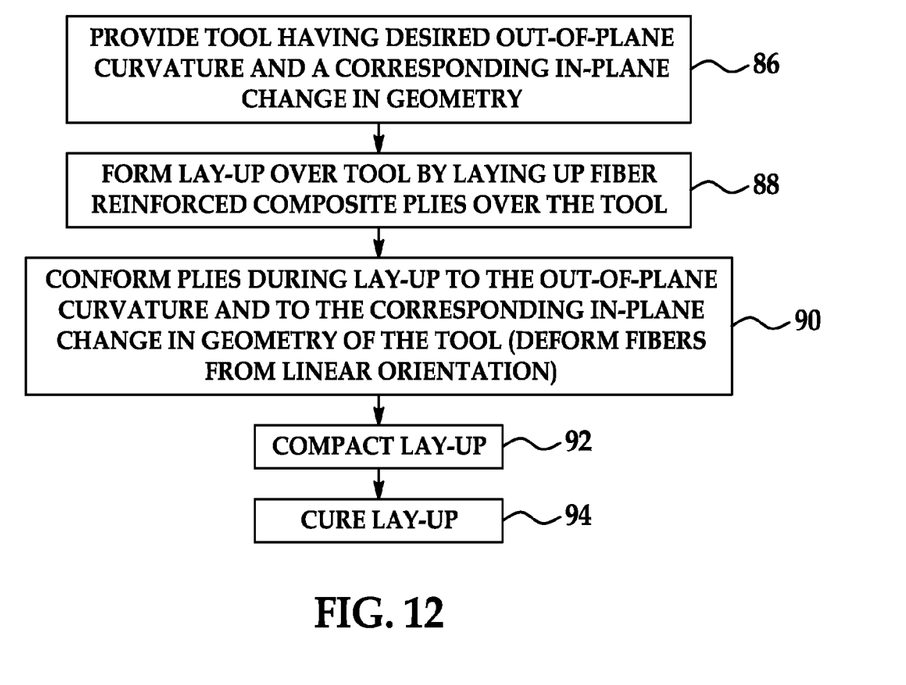
FIG. 12 is an illustration of a flow diagram of one method of forming a stiffener having an out-of-plane curvature.

Attention is now directed to FIG. 12 which illustrates the steps of a method of fabricating a substantially wrinkle-free, fiber reinforced composite stiffener, such as the previously discussed stringer 20. Beginning at step 86, a tool 42 is provided having the desired out-of-plane curvature 46 and corresponding in-plane change in geometry 47. Then at step 88, a layup 44 is formed over the tool 42 by laying up successive plies 45 (FIG. 5) of unidirectional fiber reinforced pre-preg, with fiber orientations corresponding to a desired ply schedule (not shown). Alternatively, the layup 44 may be pre-formed as a flat stack (not shown) of ordered plies 45, and the ply stack may be formed over the tool 42. Each of the plies 45, or the ply stack is laid by draping the ply 45 (or stack) over the mandrel 42 in the direction 60 shown in FIG. 5. At step 90, each of the plies 45 or the ply stack is conformed to the tool faces on the mandrel 42, including the out-of-plane curvature 46 and the corresponding in-plane curvature 49 which represents the in-plane change in geometry 47 of the mandrel 42. At step 92, the layup 44 is compacted which may include the use of compaction tools 76, (FIGS. 10 and 11) and vacuum bag processing. Finally, at step 94, the layup 44 is cured.

Figure 13:
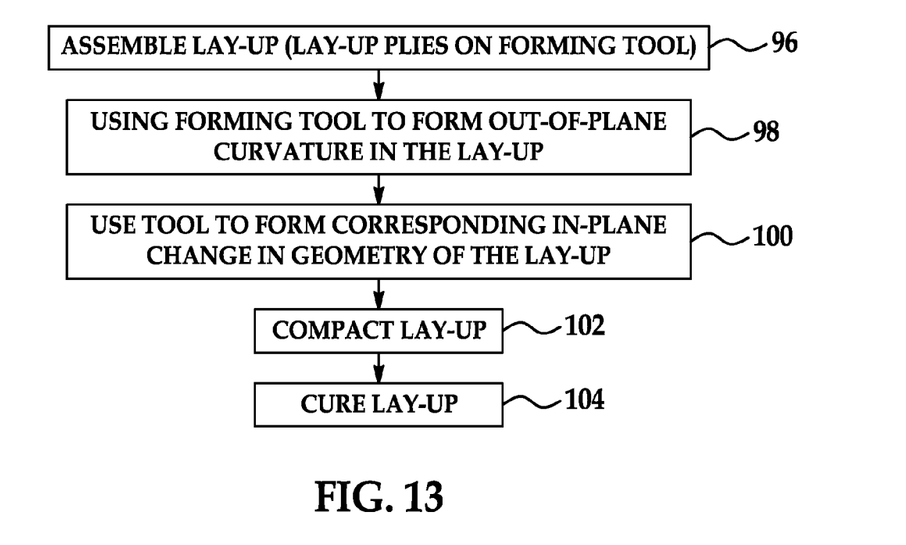
FIG. 13 is an illustration of another method of forming a stiffener having an out-of-plane curvature.

FIG. 13 illustrates another embodiment of a method for fabricating a stringer having an out-of-plane curvature 46. Beginning at 96, a layup 44 (FIG. 5) is assembled by successively laying up plies 45 of unidirectional fiber pre-preg on a suitable forming tool, such as the mandrel 42, or by laying up the plies 45 as an order flat stack of the plies. Then at 98, the tool 42 is used to form an out-of-plane curvature in the layup 44, and at 100, the tool 42 is used to form a corresponding in-plane curvature and change in geometry 41 in the layup 44. At step 102, the layup 44 is compacted, and is cured at step 104.

Figure 14:
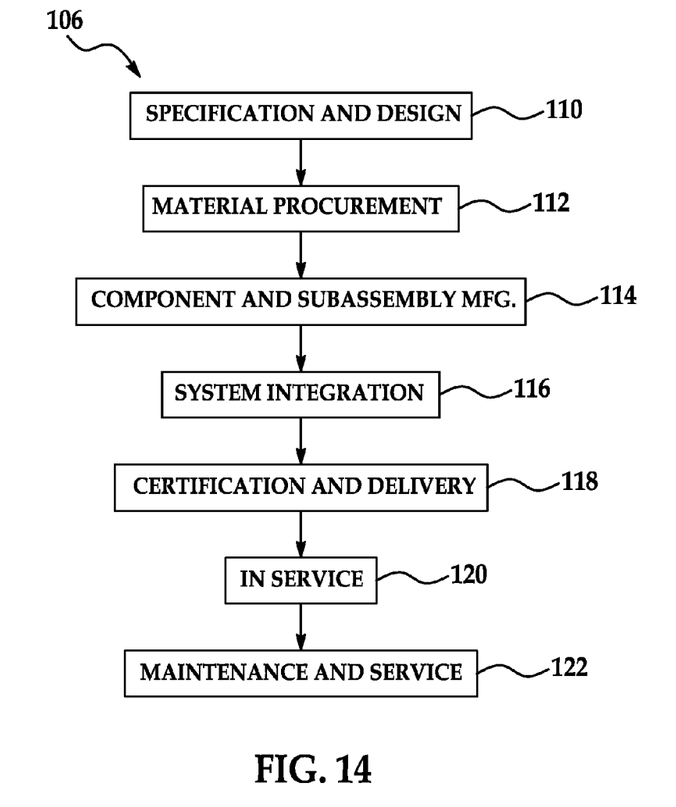
FIG. 14 is a flow diagram of aircraft production and service methodology.
Figure 15:
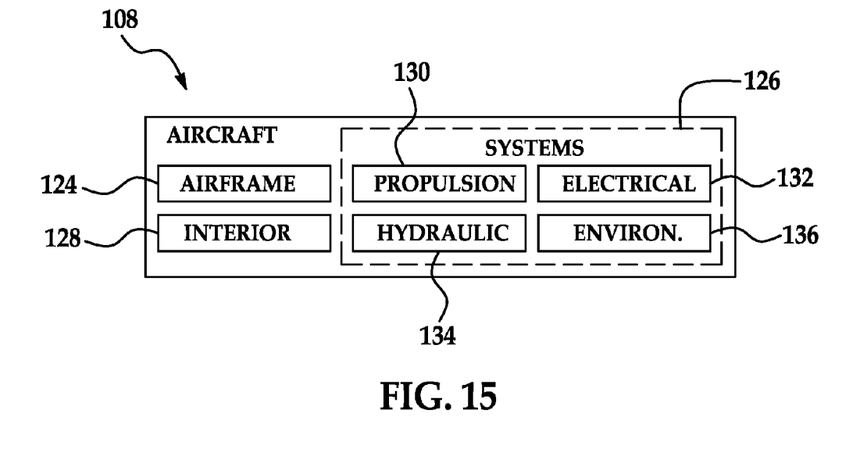
FIG. 15 is a block diagram of an aircraft.

Referring next to FIGS. 14 and 15, embodiments of the disclosure may be used in the context of an aircraft manufacturing and service method 106 as shown in FIG. 14 and an aircraft 108 as shown in FIG. 15. During pre-production, exemplary method 106 may include specification and design 110 of the aircraft 108 and material procurement 112. During production, component and subassembly manufacturing 114 and system integration 116 of the aircraft 108 takes place. The disclosed method and apparatus may be used to fabricate highly contoured stiffeners that are integrated into subassemblies used in step 114. Thereafter, the aircraft 108 may go through certification and delivery 118 in order to be placed in service 120. While in service by a customer, the aircraft 108 may be scheduled for routine maintenance and service 122 (which may also include modification, reconfiguration, refurbishment, and so on).

Each of the processes of method 106 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 108 produced by exemplary method 106 may include an airframe 124 with a plurality of systems 126 and an interior 128. Examples of high-level systems 126 include one or more of a propulsion system 130, an electrical system 132, a hydraulic system 134, and an environmental system 136. Any number of other systems may be included. Stiffeners and other composite components fabricated by the disclosed method and apparatus may be used in the airframe 124 or in the interior 124. Although an aerospace example is shown, the principles of the invention may be applied to other industries, such as the automotive industry.

The apparatus embodied herein may be employed during any one or more of the stages of the production and service method 106. For example, components or subassemblies corresponding to production process 114 may be fabricated or manufactured in a manner similar to components or subassemblies produced while the aircraft 108 is in service. Also, one or more apparatus embodiments may be utilized during the production stages 114 and 116, for example, by substantially expediting assembly of or reducing the cost of an aircraft 108. Similarly, one or more apparatus embodiments may be utilized while the aircraft 108 is in service, for example and without limitation, to maintenance and service 122.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of fabricating a fiber reinforced composite stiffener that is substantially wrinkle-free, the method comprising:
    using a tool, the tool having a sidewall, the sidewall including a first portion along a first length that is less than a total length of the sidewall, the sidewall further including a second portion along a second length that is less than the total length and a third portion along a third length that is less than the total length, the first portion being between the second portion and the third portion, the first portion having an out-of-plane curvature and an in-plane curvature, the second portion having a second curvature different than the in-plane curvature and the out-of-plane curvature, the third portion having the second curvature, the tool further having a bottom tool face along the sidewall and connected to the sidewall at an angle, the bottom tool face also having the out-of-plane curvature along the first length, and the bottom tool face further having the second curvature along the second length and the third length;
    using includes forming a lay-up over the tool by laying up a plurality of fiber reinforced composite plies over the tool, including simultaneously conforming the plurality of fiber reinforced composite plies to the first length and the second length along both the sidewall and the bottom tool face; and
    compacting the lay-up.

2. The method of claim 1, wherein reinforcing fibers in each of the plurality of fiber reinforced composite plies have a substantially unidirectional fiber orientation.

3. The method of claim 2, wherein conforming the plurality of fiber reinforced composite plies to the out-of-plane curvature includes allowing the reinforcing fibers in each of the plurality of fiber reinforced composite plies to deform generally from a nominal linear orientation to a deformed orientation determined by the out-of-plane curvature.

4. The method of claim 3, wherein conforming the plurality of fiber reinforced composite plies to the in-plane curvature includes allowing the reinforcing fibers in each of the plurality of fiber reinforced composite plies to deform generally from their nominal linear orientation to the deformed orientation as also determined by the in-plane curvature of the tool.

5. The method of claim 3, wherein compacting the lay-up includes compacting the plurality of fiber reinforced composite plies to substantially eliminate any wrinkles in the plurality of fiber reinforced composite plies and to set deformed fiber orientations into the plurality of fiber reinforced composite plies.

6. The method of claim 1, wherein fibers in at least certain of the plurality of fiber reinforced composite plies extend substantially continuously through a length of the substantially wrinkle-free fiber reinforced composite stiffener.

7. The method of claim 1 wherein the first portion is lower in height relative to the second portion, in both the sidewall and the bottom tool face.

8. A method of fabricating a substantially wrinkle-free fiber reinforced composite stringer having a hat-shaped cross section, an in-plane curvature along a length of the composite stringer, and an out-of-plane curvature along the length, the method comprising:
    assembling a lay-up by laying up fiber reinforced composite plies on a forming tool, the forming tool having a sidewall, the sidewall including a first portion along a first length that is less than a total length of the sidewall, the sidewall further including a second portion along a second length that is less than the total length and a third portion along a third length that is less than the total length, the first portion being between the second portion and the third portion, the first portion having the out-of-plane curvature and the in-plane curvature, the second portion having a second curvature different than the in-plane curvature and the out-of-plane curvature, the third portion having the second curvature, the forming tool further having a bottom tool face along the sidewall and connected to the sidewall at an angle, the bottom tool face also having the out-of-plane curvature along the first length, and the bottom tool face further having the second curvature along the second length and the third length;
    forming the out-of-plane curvature in the lay-up along both the sidewall and the bottom tool face using the forming tool; and
    while forming the out-of-plane curvature, also forming the in-plane curvature in the lay-up along both the sidewall and the bottom tool face using the forming tool, such that forming the out-of-plane curvature and forming the in-plane curvature also forms the hat-shaped cross section in a manner such that different cross sections along the length change dimensions relative to each other as a result of the out-of-plane curvature.

9. The method of claim 8, wherein the substantially wrinkle-free fiber reinforced composite stringer includes a cap, sidewalls, and bottom flanges, and wherein the out-of-plane curvature is formed in the bottom flanges of the stringer.

10. The method of claim 8, wherein the in-plane curvature is formed in the sidewalls of the substantially wrinkle-free fiber reinforced composite stringer.

11. The method of claim 8, wherein forming the out-of-plane curvature and forming the in-plane curvature includes allowing fibers in each of the fiber reinforced composite plies to deform generally from a nominal linear orientation to a deformed orientation determined by the out-of-plane curvature and the in-plane curvature.

12. The method of claim 8 wherein the first portion is lower in height relative to the second portion, in both the sidewall and the bottom tool face.

\* \* \* \* \*